(12) United States Patent
García et al.

(10) Patent No.: US 9,010,668 B2
(45) Date of Patent: Apr. 21, 2015

(54) SAFETY DEVICE FOR FOOD CUTTING MACHINE

(75) Inventors: Javier Hidalgo García, Guipúzcoa (ES); Aitor Aguírrezabalaga Zubizarreta, Guipúzcoa (ES); Aítor Gogorza Segurola, Guipúzcoa (ES)

(73) Assignee: Sammic, S.L., Azkoitia, Guipuzcoa (ES)

( * ) Notice: Subject to any disclaimer, the term of this patent is extended or adjusted under 35 U.S.C. 154(b) by 293 days.

(21) Appl. No.: 13/534,642

(22) Filed: Jun. 27, 2012

(65) Prior Publication Data
US 2013/0001340 A1 Jan. 3, 2013

(30) Foreign Application Priority Data
Jun. 30, 2011 (ES) .................................. 201100601

(51) Int. Cl.
*A47J 43/07* (2006.01)
*A47J 43/046* (2006.01)
*B02C 25/00* (2006.01)

(52) U.S. Cl.
CPC ............ *A47J 43/0777* (2013.01); *A47J 43/046* (2013.01); *A47J 43/0465* (2013.01); *B02C 25/00* (2013.01)

(58) Field of Classification Search
CPC B02C 18/0007; A47J 43/046; A47J 43/0465; A47J 43/0777

USPC .................................................. 241/36, 37.5
See application file for complete search history.

(56) References Cited

U.S. PATENT DOCUMENTS

| 4,371,118 | A | * | 2/1983 | Sontheimer et al. | ............ 241/30 |
| 4,523,720 | A | * | 6/1985 | Behringer et al. | ........... 241/37.5 |
| 4,629,131 | A | * | 12/1986 | Podell | ............................. 241/36 |
| 4,741,482 | A | * | 5/1988 | Coggiola et al. | ............. 241/37.5 |
| 4,821,968 | A | * | 4/1989 | Fleche | ......................... 241/37.5 |
| 5,852,968 | A | * | 12/1998 | Sundquist | ....................... 99/492 |
| 6,336,603 | B1 | * | 1/2002 | Karkos et al. | .............. 241/101.2 |
| 6,510,784 | B1 | * | 1/2003 | Fevre et al. | ..................... 99/492 |
| 6,669,124 | B2 | * | 12/2003 | Lazzer et al. | .................... 241/36 |
| 2010/0308142 | A1 | * | 12/2010 | Krasznai et al. | ................ 241/36 |

OTHER PUBLICATIONS

U.S. Appl. No. 13/523,160, filed Jun. 14, 2012, first named inventor Javier Hidalgo Garcia.

* cited by examiner

*Primary Examiner* — Faye Francis
*Assistant Examiner* — Onekki Jolly
(74) *Attorney, Agent, or Firm* — Donald J. Ranft; Kristen A. Mogavero; Collen IP

(57) ABSTRACT

The invention relates to a magnetic safety device especially designed for use with a combined food cutting and processing machine. An assembly of elements work together to move a magnet vertically and modify the relative position of said magnet with respect to a magnetic detector/sensor located in the interior of the motor block of the combined food cutting machine.

4 Claims, 2 Drawing Sheets

SAFETY DEVICE FOR FOOD CUTTING MACHINE

BACKGROUND

The field of application of the invention is within the industrial sector dedicated to the manufacture and/or installation of kitchen equipment, such as food slicers, food processors, etc.

Devices and machines designed for food processing-related operations, such as cutting vegetables, grating bread, emulsifying food and other similar operations are known to exist in the current state of the art. In general, machines known to exist in the current state of the art consist essentially of a closed motor block which houses a motor, a rotational shaft that emerges vertically from the motor block, and an accessory for processing the food, the structural characteristics of which may vary depending on the specific application. Therefore, said accessories can consist of a pot-type container, a cutter, an emulsifier, etc.

In the case of combined cutting machines, such machines are usually equipped with a motor block that houses cutting or grating blades or disks in its interior, as well as a thrusting element which, on one hand, allows the container accessory where the product to be processed is introduced to be closed and allows the product to remain in constant contact with the cutting or grating elements.

These types of combined cutting/grating machines are equipped with safety and control devices that only allow operation of the machine when the different components thereof are in their respective operating positions.

SUMMARY

The present invention relates to a magnetic safety device for a combined food cutting machine.

More particularly, the invention discloses a magnetic safety device especially designed for use in a kitchen robot-type combined food cutting and processing machine, especially intended and designed for combined functionalities such as grater, food cutter, etc. Such food cutting and processing machines typically include interchangeable accessories bearing the corresponding cutting head, grating head, etc., a motor block, and means for quickly anchoring and fixing the aforementioned interchangeable accessories to the motor block.

In order to increase the degree of safety of these combined cutting machines, the present invention discloses an additional safety device that is directly associated with the operation of the thrusting element by the user, such that cutting or grating is only allowed when the thrusting element and the accessory container are positioned within a specific operating range (i.e. from the moment in which the thruster closes the accessory container to that in which the cutting or grating operation is completed).

To this end, the safety device includes a magnetised element which, by virtue of its position, may be detected by a corresponding magnet sensor or detector located in the motor block, thereby allowing the combined cutting machine to be started up in a safe manner.

Figure 1:
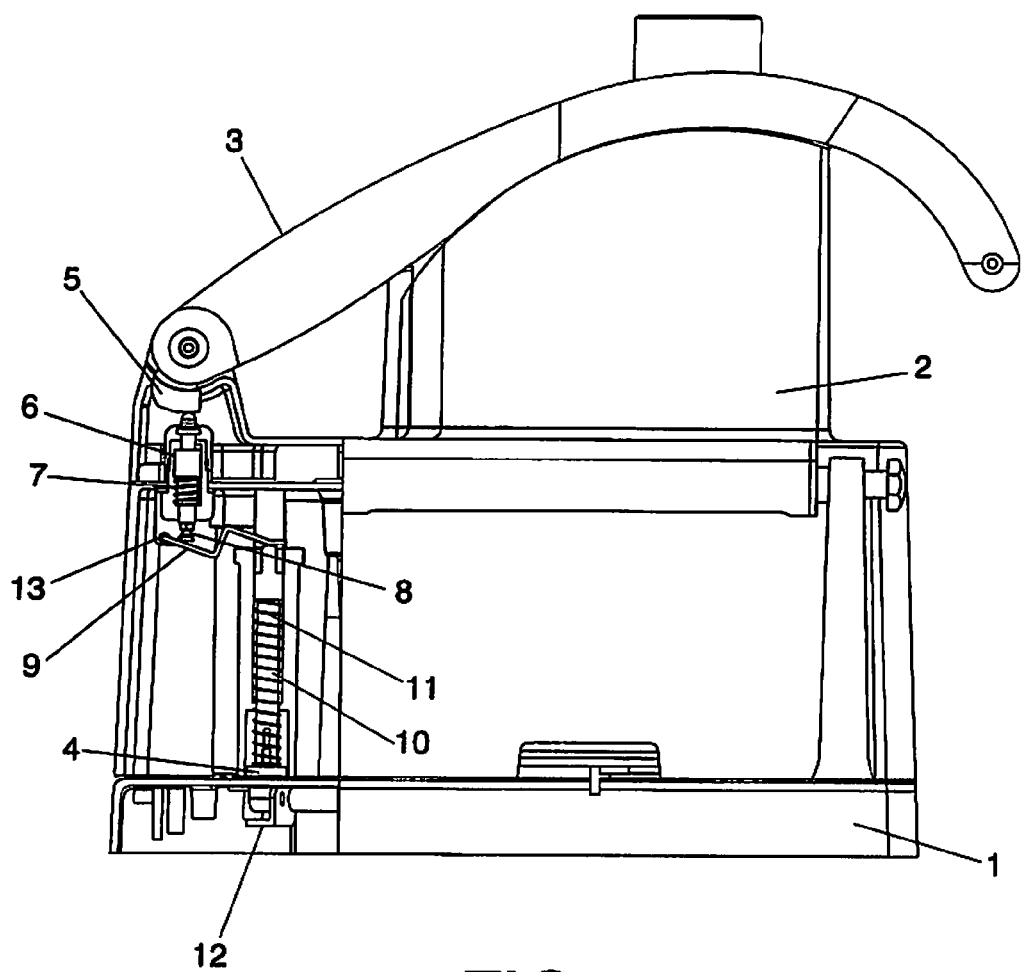

The present invention is described below on the basis of the attached figures, wherein:

FIG. 1 A longitudinal cross-section of a combined cutting machine showing the safety device disclosed herein.

Figure 2:
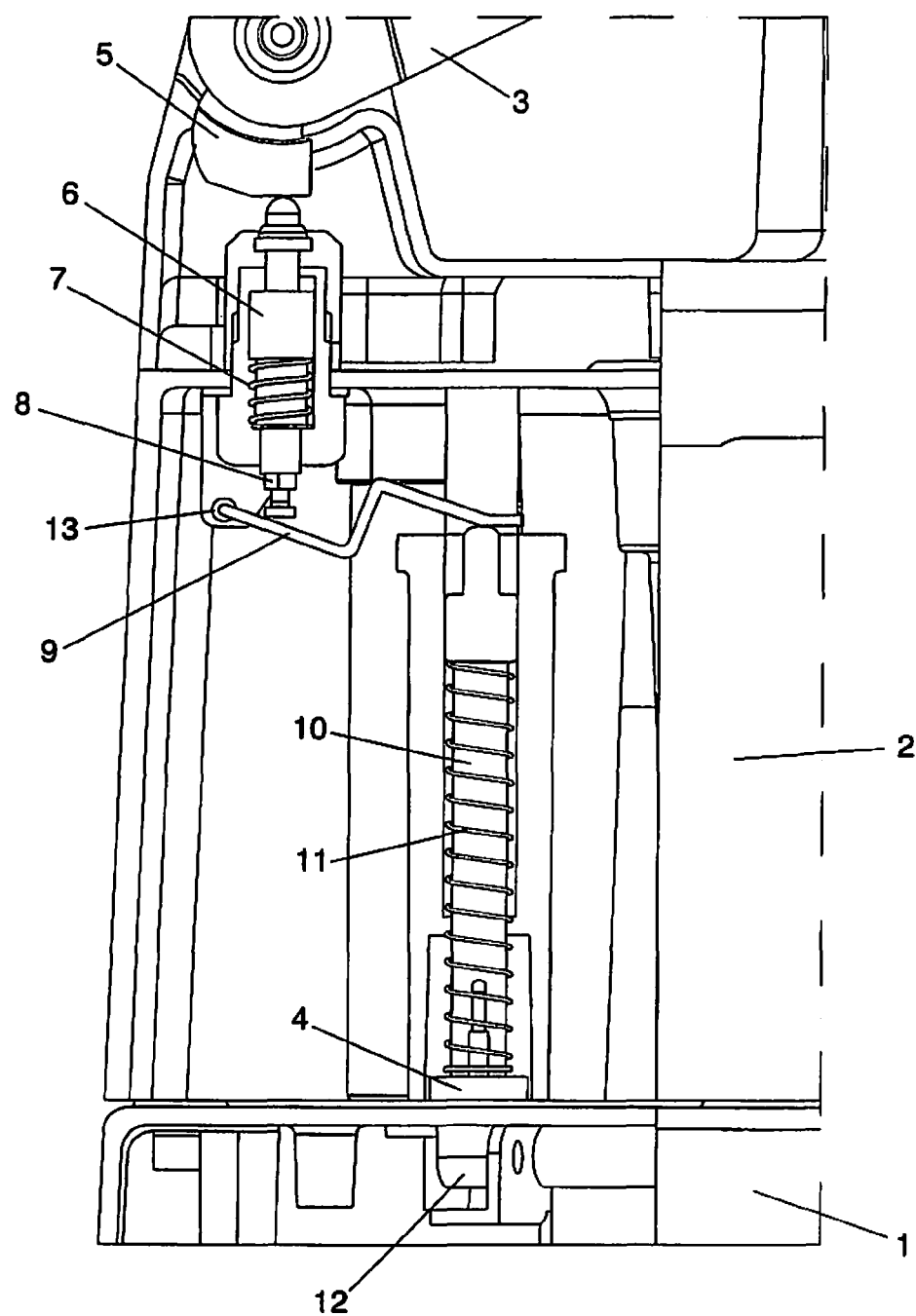

FIG. 2 A detailed side view of the safety device as disclosed herein, as incorporated in a combined cutting machine.

In one embodiment of the invention, the magnetic safety device is especially designed for use in a combined food cutting machine, having a motor block 1, an accessory container 2 designed for cutting or grating vegetables and other food products, wherein said accessory container 2 houses cutting or grating blades or disks on its lower part, and a thrusting element 3 that closes the container accessory 2 and serves to keep the product to be processed in permanent contact with the cutting or grating elements. The magnetic safety device itself consists of an assembly of elements which act upon a magnet 4 and which modify the position of the aforementioned magnet 4 relative to a magnet sensor 12. The magnet sensor 12 is located in the interior of the motor block 1, in an area near the base region where the magnet 4 is located.

The thrusting element 3, which preferably has a tilting movement in relation to a lower end thereof which is joined to the container accessory 2, has a cam 5 on said lower end. The cam 5, together with the tilting movement of the thrusting element 3, actuates a first shaft 6.

Said first shaft 6 has a first return spring 7 and an extendable screw-nut system 8 for regulating the length of the aforementioned first shaft 6.

The first shaft 6 and screw-nut 8 actuate a lever 9 which in turn actuates a second shaft 10 with its corresponding second return spring 11, at the end of which the magnet 4 is housed.

Therefore, when the user actuates the thrusting element 3, the cam 5 transmits the movement thereof to the first shaft 6, which moves the lever 9. In turn, the lever 9 rotates around a fixed point or fulcrum 13 at a certain angle due to the vertical movement of the first shaft 6, pushing the second shaft 10. The multiplier effect of the lever 9, which moves the second shaft 10 vertically, allows amplified movement of said second shaft 10 and of the magnet 4. This allows a slight movement of the first shaft 6 to translate into a significantly greater movement of the second shaft 10, thereby moving the magnet 4, located at the end thereof, in closer proximity to the magnet sensor 12 of the motor block 1, allowing not only operation of the combined cutting machine, but also increasing its operational safety.

The screw-nut system 8 allows modification of the total length of the first shaft 6 by means of simple threading, precisely regulating the moment of activation or deactivation of the combined machine in relation to the position of the thrusting element 3. The screw-nut 8 facilitates the final adjustment of the safety device based upon the accessory elements employed in the use thereof, particularly the cutting/grating accessory containers. It is not considered necessary to lengthen the content of this description for a person skilled in the art to understand its scope and the advantages ensuing from it, as well as to carry out a practical embodiment of its object.

Notwithstanding the foregoing, and given that the description made corresponds solely to an example of a preferred embodiment, it shall be understood that its essence may comprise numerous modifications and variations in detail, similarly contained within the scope of the invention, and which in particular may affect characteristics such as the shape, size or manufacturing materials, or others that do not alter the invention as it has been described and as defined in the following claims.

The invention claimed is:

1. A combined food cutting machine and magnetic safety device comprised of:
   a motor block,
   an accessory container,
   a thrusting element with a cam on the end thereof, wherein the thrusting element is capable of being actuated by a user;

and, a magnetic safety device comprising a first shaft, a first return spring, a lever having two ends opposite each other, a second shaft, a second return spring, a magnet, and a magnet sensor;

wherein the first shaft is oriented vertically and is connected to the first return spring; the lever is positioned with one end below the first shaft and the other end above the second shaft; the second shaft is oriented vertically, is connected to the second return spring, and the magnet is located at the lower end of the second shaft; the first shaft is positioned such that when the thrusting element is actuated by the user, the cam on the end of the thrusting element actuates the first shaft, thereby actuating the lever and the second shaft, and thus altering the position of the magnet relative to the magnet sensor; the magnet sensor is located in the motor block of the combined food cutting machine in a position such that it is capable of detecting the magnet only when it is in a position corresponding to when the thrusting element is actuated.

2. A combined food cutting machine and magnetic safety device of claim 1 further comprised of an extendable screw-nut system, wherein the first shaft has a lower end, and said lower end is connected to the extendable screw-nut system.

3. A magnetic safety device, designed for use in a food cutting machine, comprised of:

a first shaft,
a first return spring,
a lever having two ends opposite each other,
a second shaft,
a second return spring,
a magnet, and
a magnet sensor;

wherein the first shaft is oriented vertically and is connected to the first return spring; the lever is positioned with one end below the first shaft and the other end above the second shaft; the second shaft is oriented vertically, is connected to the second return spring, and the magnet is located at the lower end of the second shaft; when the first shaft is actuated it thereby actuates the lever and the second shaft, thus altering the position of the magnet relative to the magnet sensor; the magnet sensor is located in a position such that it is capable of detecting the magnet only when the magnet is in a position corresponding to when the first shaft is actuated.

4. The magnetic safety device of claim 3 further comprised of an extendable screw-nut system, wherein the first shaft has a lower end, and said lower end is connected to the extendable screw-nut system.

* * * * *